United States Patent [19]

Belknap

[11] Patent Number: 4,584,430

[45] Date of Patent: Apr. 22, 1986

[54] SAFETY ELECTRICAL RECEPTACLE COVER PLATE

[76] Inventor: Lewis J. Belknap, 7425 Davis Mill Cir., Harrison, Tenn. 37341

[21] Appl. No.: 720,888

[22] Filed: Apr. 8, 1985

[51] Int. Cl.[4] .......... H02G 3/14

[52] U.S. Cl. .......... 174/67; 174/66; 339/36; 339/37; 339/41; 220/242

[58] Field of Search .......... 339/44 R, 36, 37, 39, 339/42, 49 R, 44 M, 41; 174/66, 67; 220/241, 242

[56] References Cited

U.S. PATENT DOCUMENTS

| | | | |
|---|---|---|---|
| 1,989,693 | 2/1935 | Hubbell, Jr. | 339/41 |
| 2,507,654 | 5/1950 | Stubbs | 174/67 |
| 2,515,003 | 7/1950 | Hamilton | 174/67 X |
| 2,641,627 | 6/1953 | Lewis | 174/67 |
| 3,201,740 | 8/1965 | Rubens | 174/67 X |

*Primary Examiner*—A. T. Grimley
*Assistant Examiner*—Jane Lau
*Attorney, Agent, or Firm*—Alan Ruderman

[57] ABSTRACT

A safety electrical receptacle cover plate for dual socket wall receptacles has rotatable shutters adapted for receiving the prongs of a plug, but is normally biased by non-conducting resilient members to close registery with the slots of the socket members. The shutters are received in recesses formed in the rear of the plate, have central portions disposed through openings extending through the plate, and have stepped outer portions journalled in the recesses. A pair of oppositely disposed arms are formed on the outer portions and carry members about which resilient bands are disposed for urging the shutters out of the positions of registery. The periphery of the cover plate has a lip about which a resiliently compressible material is disposed so that when the plate is secured to a receptacle the plate is adjustably located relative to the wall to permit the shutters to abut the face of the sockets thereby ensuring proper electrical contact of the plug prongs with the sockets.

15 Claims, 5 Drawing Figures

SAFETY ELECTRICAL RECEPTACLE COVER PLATE

BACKGROUND OF THE INVENTION

This invention relates to electrical outlet receptacle covers, and more particularly to a fail-safe safety cover plate for attachment to an electrical wall receptacle for protecting against accidental insertion of a plug or foreign objects into the sockets of the receptacle, and includes means for ensuring proper electrical contact of the prongs of a plug when correctly inserted.

Many household accidents have resulted from electrical shocks occurring when meddling or curious children have inserted small metallic items into the electrical outlet receptacle sockets. The prior art has recognized this problem and has dealt with it in various ways. Small plastic socket-like members are marketed for insertion into unused outlet sockets to close the sockets from insertion of such items. However, these members are readily removed by a child and have limited affect. Thus, various other proposals have been made using moveable shutter type members in an attempt to solve this problem, the shutter members acting to close the sockets until moved by the prongs of a plug to align prong receiving slots of the shutter with the socket slots. For example, U.S. Pat. Nos. 2,820,842; 3,068,442; and 3,865,456 disclose receptacle cover plates having linearly slideable shutters, while U.S. Pat. Nos. 1,159,207; 1,989,693; 2,498,642; 2,524,250; 2,641,627; 2,752,581; and 3,113,174 disclose either cover plates or receptacles having rotatable shutters, and U.S. Pat. No. 2,455,582 discloses a plate which appears to have a rotary and linearly removable shutter.

One of the difficulties of the known cover plates having such shutters is the use of metallic springs for biasing the shutters to the socket closing position. If, for example, such a spring fails a potentially dangerous condition could result if a portion of the spring is impelled and lodged into the receptacle. In order to overcome this difficulty the prior art placed a back plate between the springs and the receptacle. Such a construction is illustrated, for example, in Bierce U.S. Pat. No. 2,524,250 and Lewis U.S. Pat. No. 2,641,627. However, when a back plate is used there is the possibility of an inadequate contact being made between the prongs of a plug and the socket of the receptacle. Cover plates having a likelihood of this occurring will not obtain certification by certifying testing organizations. Thus, ideally, the shutters should abut the receptacle socket faces and provide minimum spacing between the face of an inserted plug and the face of the receptacle socket.

SUMMARY OF THE INVENTION

Cosequently, it is a primary object of the present invention to provide a fail-safe electrical receptacle cover plate having rotatable shutter means biased to close the sockets of the receptacle when a plug is removed, and moveable by insertion and rotation of the plug to open passage of the prongs into electrical contact with the socket.

It is another object of the present invention to provide a safety electrical receptacle cover plate having a rotatable shutter resiliently biased by non-conducting means, the plate having means for permitting the shutter to abut the face of the socket of an electrical receptacle.

Accordingly, the present invention provides a safety electrical wall receptacle cover plate adapted to close a conventional household electrical outlet, the plate having rotatable shutter members adapted to receive a conventional plug and which is normally biased to close entry into the socket slots of the outlet and which may receive a portion of the prongs of the plug in slots therein when such entry is closed, the shutter members being rotatable by turning the plug with the prongs so inserted to align the slots of the shutter with the socket slots of the outlet. The shutters are received and journally rotate within openings in the plate and have oppositely disposed arms extending therefrom which are resiliently connected to the rear of the plate by non-conducting resilient members, preferably inexpensive readily available bands. The rear of the face plate has recessed areas within which the shutters are disposed and the shutters do not project beyond the rear face of the plate. A mounting block between the shutters is disposed for entry between the sockets of conventional duplex receptacles. Moreover, so that the shutters may abut the receptacle face which extends outwardly from the surface of the wall within which such receptacle is mounted, the peripheral margin of the plate extends only slightly beyond the rear surface of the shutter and includes a compressible material which permits the plate and the shutters to be adjustably located relative to the wall, thereby permitting the plate to be attached to the receptacle so that the shutters abut the socket face of the receptacle outlet while the peripheral margin of the plate abuts the wall.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
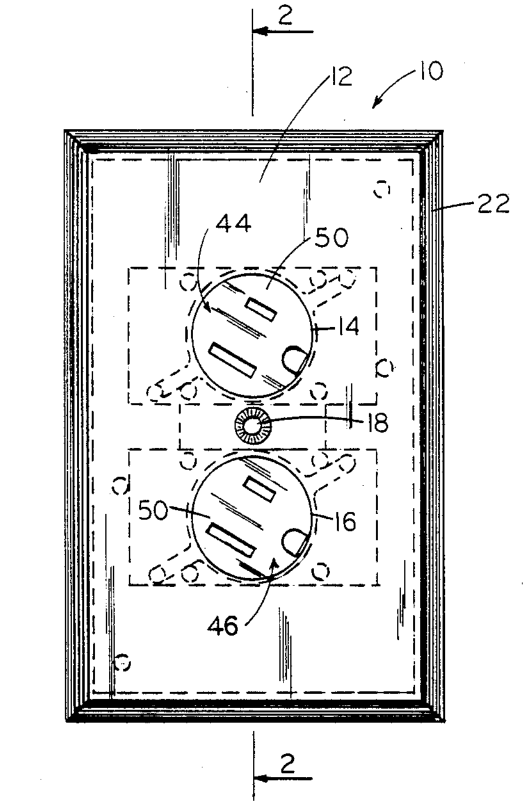
FIG. 1 is a front elevational view of a safety electrical receptacle cover plate constructed in accordance with the principles of the present invention, parts thereof behind the front face being illustrated by dotted lines.
Figure 2:
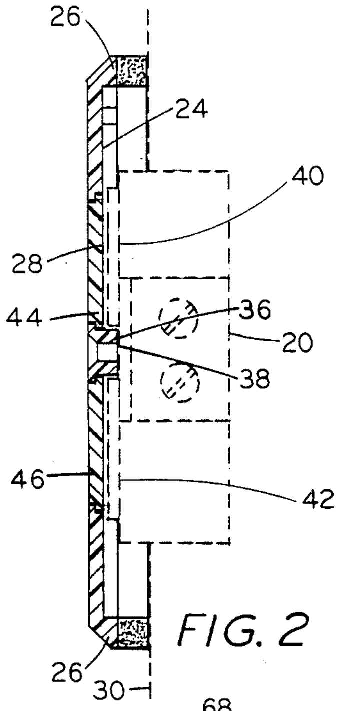
FIG. 2 is a cross sectional view taken substantially along line 2—2 of FIG. 1 and illustrating a duplex wall receptacle.

Referring now to the drawings there is illustrated a safety electrical receptacle cover plate generally indicated in FIG. 1 at 10, the plate having the general form of a conventional rectangular receptacle cover plate for a duplex wall receptacle. The plate has an outer front surface 12 including a pair of spaced openings 14 and 16 separated by a screw receiving opening 18 adapted for receiving a screw (not illustrated) for securing the plate to the center of the receptacle 20. For reasons which will become apparent the openings 14 and 16 are circular in shape. The outer surface 12 of the plate preferably tapers such as at 22 toward the side edge margins of the plate. The sides of the plate project slightly rearwardly beyond the rear surface 24 of the plate to form a rearwardly extending peripheral lip 26, the lip projecting beyond the surface 24 by an amount approximating that which the face 28 of the receptacle sockets project from the wall 30 in which it is mounted.

Figure 3:
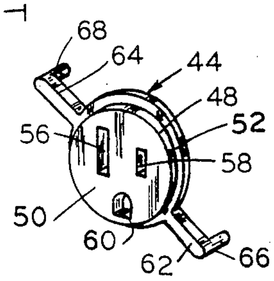
FIG. 3 is a front perspective view of one shutter member disassembled from the plate.

At the rear of the plate the surface 24 has a pair of recesses 32, 34 spaced apart by a block 36 stepped outwardly from the surface 24 an amount greater than the lips 26 for receipt within the screw receiving recess 38 between the socket portions 40, 42 of the duplex receptacle 20, the screw receiving opening 18 extending through the block 36. Disposed within each opening 14, 16 is a respective circular disc shutter 44, 46. The shutters 44, 46 are identical and, as illustrated in FIG. 3 in regard to the shutter 44, are stepped at 48 from a thick central circular portion 50 to a thinner outer portion 52. The central portions 50 have a configuration slightly smaller than the openings 14 and 16 for receipt therein while permitting rotation of the central portion within the respective opening. The thickness of the shutters is substantially equal to that of the plate from the front surface 12 to the rear surface 24, the outer portion 52 having a thickness substantially equal to the depth of the recesses 32, 34 from the rear surface 24 so that the front face of the circular portion 50 is substantially flush with the face 12 and the rear face 54 of each shutter is substantially co-planar with the surface 24 while the step 48 permits the surface 52 to abut the surface of the respective recess.

Formed in the central portion 50 of each shutter are conventional electrical plug prong receiving slots 56, 58, 60, preferably of the grounded plug and receptacle type, which may be aligned with and overlay similar slots in the socket portions 40, 42 of the receptacle so that the prongs of a plug may be inserted through the openings 56, 58, 60 and into the receptacle socket openings. However, since the shutters 44, 46 may rotate relative to the receptacle socket openings, the openings 56, 58, 60 may be moved out of alignment therewith to close off access to the socket openings and thus the electrical source.

Figure 4:
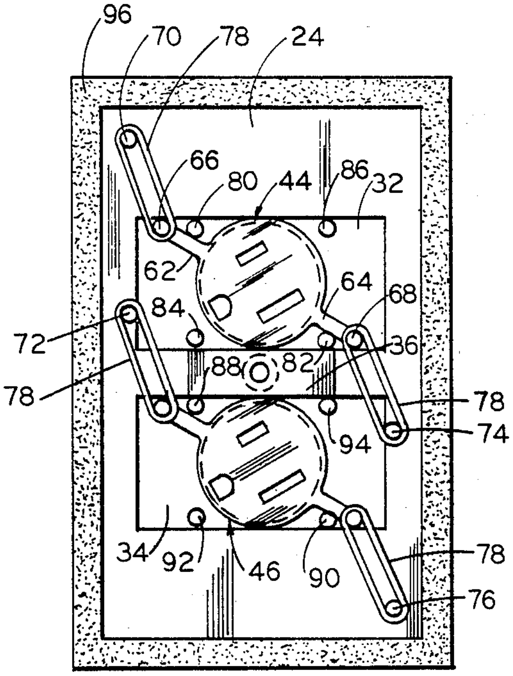
FIG. 4 is a rear view of the cover plate of FIG. 1 with the shutters illustrated in their socket closing positions.
Figure 5:
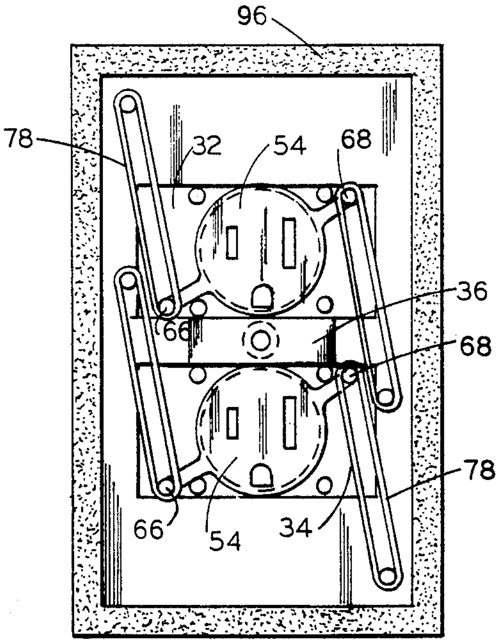
FIG. 5 is a view similar to FIG. 4 with both shutters illustrated in the socket entry positions.

As illustrated in FIG. 3 each shutter has a pair of arms 62, 64 extending outwardly, preferably in radially opposed directions, from the outer portions 52 thereof. The end of each arm 62, 64 has a respective outstanding peg 66, 68 projecting remotely from the central portion, i.e., rearwardly. Extending from the rear surface 24 of the plate are four posts 70, 72, 74, 76 disposed at locations such that two posts 70, 72 are above and adjacent one side of the respective recess 32 and 34, and the other posts 74,76 are below and adjacent the other side of the recesses 32, 34. Disposed about the post 70 and the peg 66 of the shutter 44 is an electrically non-conductive resilient member 78 preferably in the form of a continuous band. Preferably the member 78 is a conventional "rubber band" since these are inexpensive and readily available, but other such resilient materials can be used and are intended to be included within the term "rubber band." A similar rubber band is disposed about the post 74 and the peg 68 of the shutter 44, while similar rubber bands connect the post 72 and 76 with the pegs 66 and 68 respectively of the shutter 46. It should thus be clear that the disposition of the posts 70–76 is such that the rubber bands 78 tend to bias and urge the shutters 44, 46 in a clockwise direction as viewed in FIGS. 4 and 5, and a counter-clockwise position as viewed in FIG. 1, the disposition of the openings 56, 58, 60 relative to the arms 62, 64 being such that unless the bias of the bands 78 is overcome by a shutter being rotated in the opposite direction, the openings are out of alignment with the socket slots of the receptacle. For example, FIG. 5 illustrates the disposition of the shutters 44 and 46 and the associated elements when the openings 56,58, 60 are rotated to the position of alignment with the socket slots, this being accomplished by insertion of the prongs of a plug partially into the openings 56–60 and rotation thereof until alignment occurs. Thus, by inserting the prongs and rotating and pushing inwardly the alignment position occurs in approximately one quarter of the turn of the shutters.

Disposed within and extending from each recess 32, 34 are four posts 80, 82, 84, 86 and 88, 90, 92, 94 respectively. These posts serve two functions. First, the four posts 80–86 are spaced apart for disposition about the socket portion 40 while the four posts 88–94 function similarly with regard to the socket portion 42, therefy acting to provide alignment aids when the cover plate is mounted on the receptacle. Secondly, the posts act as stop members. The posts 80 and 82 provide abutment stops for the arms 62 and 64 respectively of the shutter 44 to limit rotation thereof when the shutter is biased to disalign and close off entry into the corresponding socket slots, while the posts 84 and 86 provide abutment stops for the arms 62 and 64 respectively when a plug has been inserted and the shutter 44 is rotated to the entry position with the openings 56, 58, 60 aligned with the slots of the corresponding socket 40. Similarly the posts 88 and 90 act as stops for limiting rotation of the shutter 46 to the proper disalignment position, and the posts 92 and 94 act as abutment stops to limit rotation of the shutter 46 to the correct alignment postiion for entry of the prong of a plug into the opening of the socket 42. The posts 70–76 and the posts 80–84 extend outwardly from their respective surfaces 24 and 32, 34, a distance equal to or less than the depth of the peripheral lip 26, while the pegs 66, 68 similarly extend outwardly from the arms 62, 64 an amount that does not exceed the depth of the lip 26.

Disposed entirely about the lip 26 is a readily compressible resilient material 96, such as polyurethane foam. Thus, when the plate is positioned over the receptacle and the periphery of the plate abuts the wall 30, the material 96 on the periphery may be compressed as the plate is secured to the receptacle by the screw until the shutters 44, 46 properly contact the faces of the socket members 40, 42. Thus, even though receptacles are installed with the socket members 40, 42 projecting varying amounts from the wall 30, the plate of the present invention provides proper engagement of the shutters with the socket faces in substantially all cases. The failure of prior art safety type plates to ensure proper engagement of the shutters with the receptacle socket faces is thereby overcome by the compressible material 96. Moreover, a synergistic effect is provided by the use of the compressible material 96 especially one having relatively good insulating properties such as the polyethelene foam. For example, most electrical wall receptacles on outside walls have large heat loss from the interior of a room due to air draft, and by using an insulating material about the peripheral lip of the plate these heat loses are substantially reduced.

Consequently, by the safety receptacle cover plate of the present invention provision is made for ensuring proper contact between the shutters and the receptacle sockets by not necessitating the use of a back plate to protect against a rupture of the shutter biasing member, and furthermore, the readily compressible material about the periphery of the plate permits the shutters to be drawn against the socket members. This minimizes the chances of having poor contact between the prongs of a plug and the electrical elements within the socket members in a manner not heretofore provided by the prior art.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A safety cover plate for an electrical wall receptacle having dual socket elements including slots for receiving the prongs of a plug, said cover plate comprising a base plate having a front face and a rear face, a lip extending rearwardly about the periphery of the plate beyond the rear surface, a pair of recesses formed in the rear face, a circular opening formed in each recess extending through the front face, the openings being spaced apart for overlaying the socket elements of said receptacle, a shutter disposed within each recess having a central portion disposed within the corresponding opening, each shutter including a journal surface for rotatably sliding on the surface of the respective recess, means defining plug receivable slots in each shutter adapted to register with the slots in the socket elements, a pair of arms formed on and extending from each shutter, non-conducting resilient means connected to each arm for rotatably urging the corresponding shutter to a position where the corresponding slots of each shutter are out of registery with the slots of the respective socket elements and for permitting registery of said slots upon overcoming the urging of said resilient means, and resiliently compressible material disposed about said lip and compressible upon attachment of said cover plate to a receptacle for permitting said shutters to be drawn into abutment with the respective socket elements.

2. A safety cover plate as recited in claim 1, wherein each arm includes a peg extending therefrom substantially normal to the plane of the shutters, a post corresponding to and substantially parallel to each peg extending from the rear face of said base plate, said resilient means comprising a band disposed about each peg and a corresponding post.

3. A safety cover plate as recited in claim 2, wherein said bands comprise rubber.

4. A safety cover plate as recited in claim 2, including a pair of stop members for each arm, one stop member for each are being disposed for limiting the position of the corresponding shutter when the slots are out of registery, and one stop member for each arm being disposed for limiting the position of the corresponding shutter to the position wherein the slots are in registery.

5. A safety cover plate as recited in claim 4, wherein said stop members comprise posts extending from the surface of each recess substantially parallel to the pegs.

6. A safety cover plate as recited in claim 5, wherein said posts are spaced apart for disposition about the corresponding socket elements for aligning the plate with the receptacle.

7. A safety cover plate as recited in claim 1, wherein each shutter comprises a stepped outer portion extending from said central portion defining said journal means, and said arms being formed on said outer portion.

8. A safety cover plate as recited in claim 7, wherein the thickness of said central portion is substantially equal to the thickness of said base plate from the front face to the rear face, and the thickness of said stepped outer portion is substantially equal to the thickness of each recess from the front face of the base plate to the surface of the recess.

9. A safety cover plate as recited in claim 8, wherein each are includes a peg extending therefrom substantially normal to the plane of the shutters, a post corresponding to and substantially parallel to each peg extending from the rear face of said base plate, said resilient means comprising a band disposed about each peg and a corresponding post.

10. A safety cover plate as recited in claim 9, wherein said bands comprise rubber.

11. A safety cover plate as recited in claim 9, including a pair of stop members for each arm, one stop member for each arm being disposed for limiting the position of the corresponding shutter when the slots are out of registery, and one stop member for each are being disposed for limiting the position of the corresponding shutter to the position wherein the slots are in registery.

12. A safety cover plate as recited in claim 11, wherein said stop members comprise posts extending from the surface of each recess substantially parallel to the pegs.

13. A safety cover plate as recited in claim 12, wherein said posts are spaced apart for disposition about the corresponding socket elements for aligning the plate with the receptacle.

14. A safety cover plate as recited in claim 12, wherein said resilient compressible material comprises polyurethene foam.

15. A safety cover plate as recited in claim 14, wherein said bands comprise rubber.

* * * * *